United States Patent [19]

Willatt

[11] 4,262,876
[45] Apr. 21, 1981

[54] VALVE FOR FLEXIBLE TUBING AND METHOD

[76] Inventor: Arnold F. Willatt, 238 D St., San Raphael, Calif. 94901

[21] Appl. No.: 28,526

[22] Filed: Apr. 9, 1979

[51] Int. Cl.³ .............................................. F16K 13/00
[52] U.S. Cl. ............................................ 251/9; 251/7
[58] Field of Search ............................ 251/4, 6, 7, 9

[56] References Cited

U.S. PATENT DOCUMENTS

| | | | |
|---|---|---|---|
| 2,825,333 | 3/1958 | Broman | 251/9 X |
| 3,497,175 | 2/1970 | Koland | 251/9 |
| 3,759,483 | 9/1973 | Baxter | 251/7 X |

Primary Examiner—Harold W. Weakley
Attorney, Agent, or Firm—Flehr, Hohbach, Test, Albritton & Herbert

[57] ABSTRACT

A valve is provided for controlling the flow of fluid through a flexible conduit such as a length of flexible tubing. The valve includes means for exerting a force against the tubing to deform the tubing and cut off flow therethrough. The force is applied in a direction perpendicular to the flow of axis of the tubing to provide an opposing force to the internal fluid pressure which is equal at any given fluid pressure for either flow direction through the tubing. Movable means are also provided to restrain the means for exerting a force against the tubing in a closed position wherein the flow is cut off. The valve also employs a base member, means for locating the tubing adjacent the base member, and compression means for exerting the perpendicular force against the tubing. An embodiment which permits remote control of the valve is also provided.

1 Claim, 6 Drawing Figures

VALVE FOR FLEXIBLE TUBING AND METHOD

BACKGROUND OF THE INVENTION

The invention relates generally to fluid controlled valves and more particularly to valves for controlling fluid flow through a flexible tubing.

In many applications of flexible tubing of relatively large diameter, for example in the transmission and use of geothermal gases, it is necessary and desirable to employ valves for controlling the flow of fluid. Installation of a valve element can be accomplished by separating the tubing and inserting a valve between the separated tubing portions. Disadvantages associated with installed line valves of this type include the need to make reliable connections between the tubing and the valve element, and the that fact flow through the tubing must be stopped during installation. An alternative method of flow control for flexible tubing is to install a clamp on the tubing. A clamp is not well adapted to applications where remote control of the valve is desirable, however. For example, to operate a clamp by means of a control cable or other mechanical linkage presents the problem of transmitting an adequate force to reliably close the tubing; however, the clamp pressure must be sufficient to resist being forced open by fluid pressure in the tubing. This conflict in requirements is compounded when the tubing is carrying fluid in different directions from time to time. In such a situation the clamp must be able to resist being forced open from either direction by fluid pressure in the tubing.

OBJECTS AND SUMMARY OF THE INVENTION

It is a general object of the present invention to provide a valve and method for controlling the flow of fluid through a continuous piece of flexible tubing.

Another object of the invention is to provide a valve for use with flexible tubing which is reliable and which can allow for remote control.

Another object of the invention is to provide a valve for flexible tubing which will control with equal facility flow in either direction through the tubing.

Accordingly, the invention provides a valve for controlling the flow of fluid through a length of flexible tubing. The valve comprises a base member, means for locating the tubing adjacent the base member, and compression means exerting a force against the tubing substantially perpendicular to the flow axis of the tubing. The compression means serves to compress the tubing against the base member and restrict fluid flow through the tubing. The method of the present invention includes positioning the tubing adjacent a fixed base member and applying a force against the tubing in a direction perpendicular to the flow axis of the tubing. The perpendicular application of force squeezes the tubing against the base member to control the flow of fluid. In both the method and apparatus, the perpendicular application of force against the tubing serves to resist fluid pressure from either direction in the tubing equally.

DESCRIPTION OF THE PREFERRED EMBODIMENT

Figure 1:
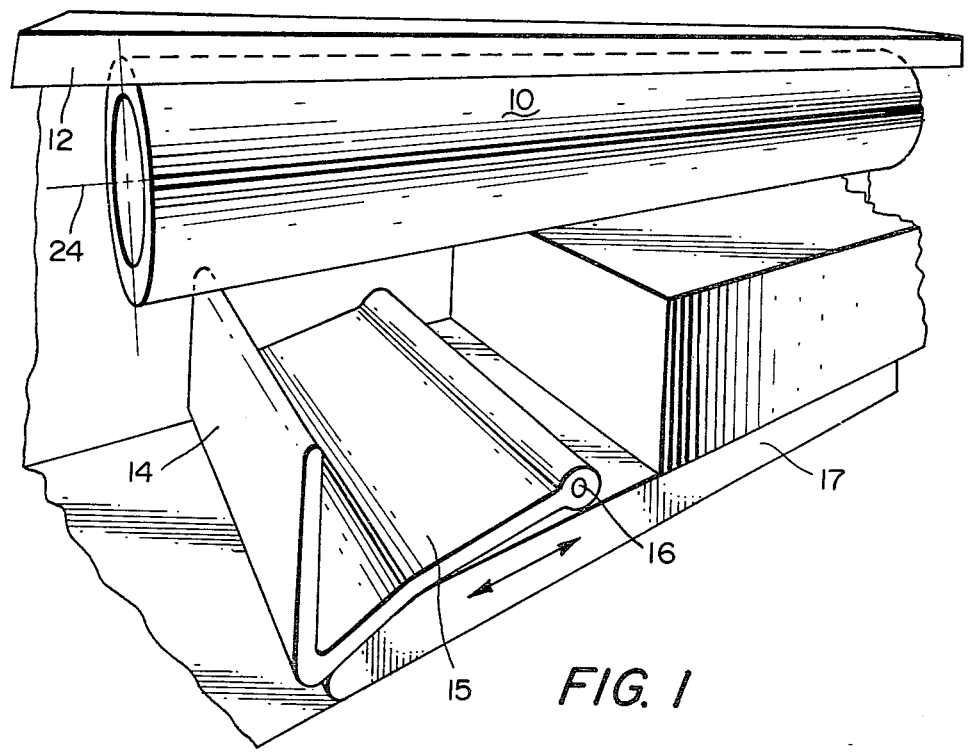
FIG. 1 is a perspective view showing the preferred embodiment of a valve according to the present invention.
Figure 2:
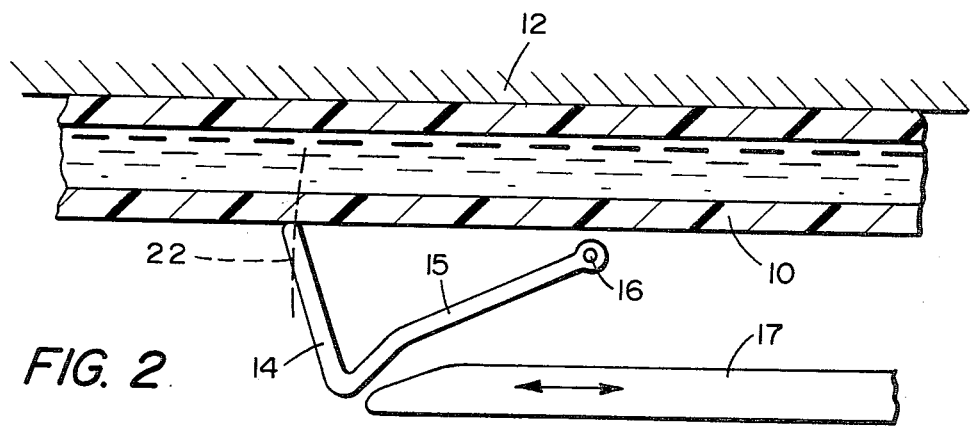
FIG. 2 is a plan view in partial cross section showing the valve of FIG. 1 in the open position.
Figure 3:
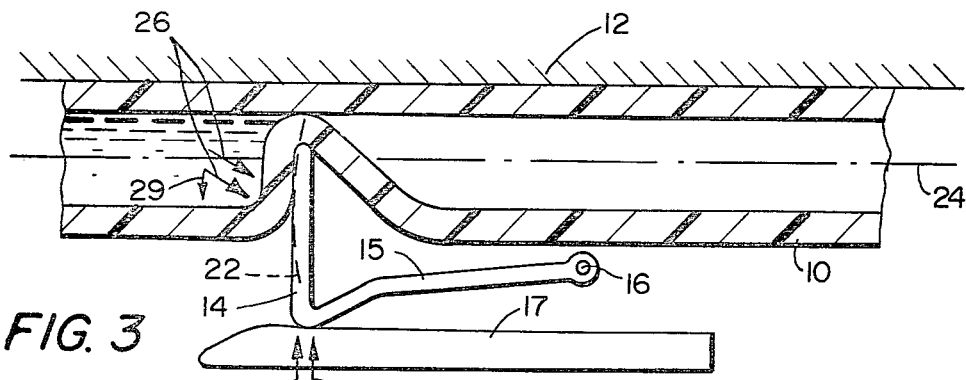
FIGS. 3 and 4 are views in partial cross section as in FIG. 2 showing the operation of the valve when in the closed position.
Figure 4:
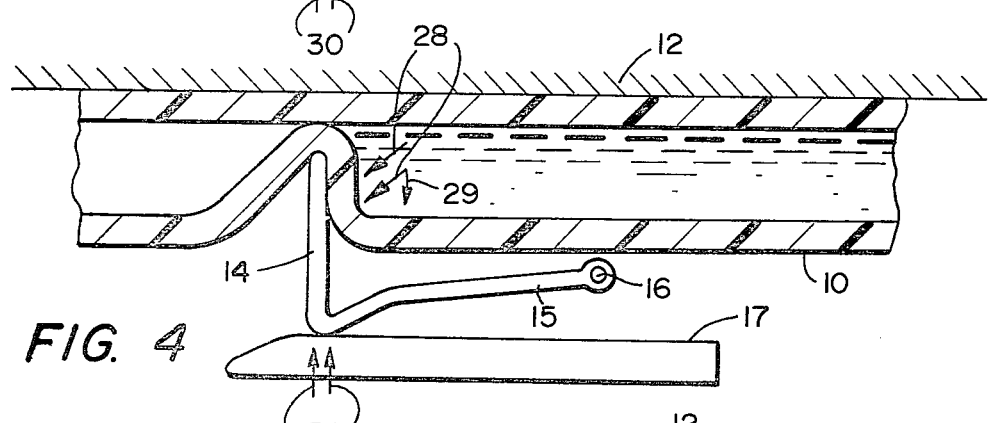

Referring to FIGS. 1 and 2, a preferred embodiment of a valve for controlling the flow of fluid through a length of flexible tubing 10 is shown. Tubing 10 can be any well-known type of flexible conduit material, for example, neoprene. The valve for controlling fluid flow through tubing 10 includes a base member 12, consisting of a surface against which the tubing rests, and compression means in the form of a compression member 14. The tubing is located adjacent base member 12 between the base member 12 and the compression member 14. The compression member 14 is attached to a pivotally supported arm 15, mounted for rotation about a pivot 16. The compression member serves as a means for exerting a force against the conduit/tubing 10 to deform the tubing and cut off flow therethrough, as is shown in FIGS. 3 and 4. The preferred embodiment also includes an incline member 17 which is movable generally parallel with the tubing to restrain compression member 14 in its closed position (see FIGS. 3, 4 and 6).

In its preferred form, the compression member 14 is attached at the outer end of pivot arm 15, and is preferably relatively flat and oriented to extend across the tubing 10 (see FIG. 1). The compression member 14 is movable together with pivot arm 15 along an arcuate path 22 between an open position, shown in FIG. 2, and a closed position, shown in FIGS. 3 and 4. In the open position, the tubing released and fluid flow in the tubing is not restricted. In the closed position, compression member 14 closely approaches base member 12, causing the intervening tubing 10 to be squeezed and closed. Arcuate path 22 brings the compression member 14 into a perpendicular orientation with respect to base member 12 when in its closed position (see FIG. 3).

Base member 12, against which the tubing is located, and compression member 14, together are used to carry out the method of flow control for flexible tubing according to the present invention. Referring to FIG. 3, compression member 14 performs the step of exerting a force against the tubing perpendicular to the flow axis 24 of the tubing, when the compression member 14 is in its closed position. The perpendicular force applied presses or squeezes the tubing against the base member 12 to restrict and cut off fluid flow.

The fact that the force against the tubing is applied perpendicularly means that fluid pressure from either direction in the tubing is resisted equally by the valve, as illustrated by comparing FIGS. 3 and 4. In FIG. 3, fluid flow prior to being cut off was from left to right. With the compression member in the closed position, fluid pressure and the resiliency of the tubing in FIG. 3 together exert a force in the general direction of arrows 26. In FIG. 4, the direction of flow in tubing 10 before being cut off was from right to left. The internal fluid pressure and the resiliency of the tubing in FIG. 3 together exert a force in the general direction of arrows 28. In both FIGS. 3 and 4, the force exerted by fluid pressure and the tubing will tend to counteract the force being applied externally by the compression member 14 to close the tubing. Even if tubing resiliency is ignored, fluid pressure in the tubing wall tend to exert a force to reopen the tubing. This is best illustrated by thinking of arrows 26 and 28 as force vectors which contain components pointing downwardly (designated 29 in FIGS. 3 and 4). Given equal fluid pressure in either direction, the downwardly-directed force components 29 will be the same in FIGS. 3 and 4. Counteracting the reopening force from the internal fluid pressure is the force being exerted by compression member 14, in the direction of arrows 30. The force exerted against the tubing by the compression member is substantially perpendicular to the flow axis of the tubing, in accordance with the present invention. As can be seen, the closing force 30 provides an opposing force to the internal fluid pressure in the tubing which is equal at any given fluid pressure for either flow direction through the tubing.

If the closing force were other than perpendicular to the flow axis of the tubing, fluid pressure would act unequally against the closing force, depending on the direction of flow. The valve might be reopened by fluid pressure from one direction whereas it would remain closed if the flow were reversed. The present invention eliminates this problem.

Figure 5:
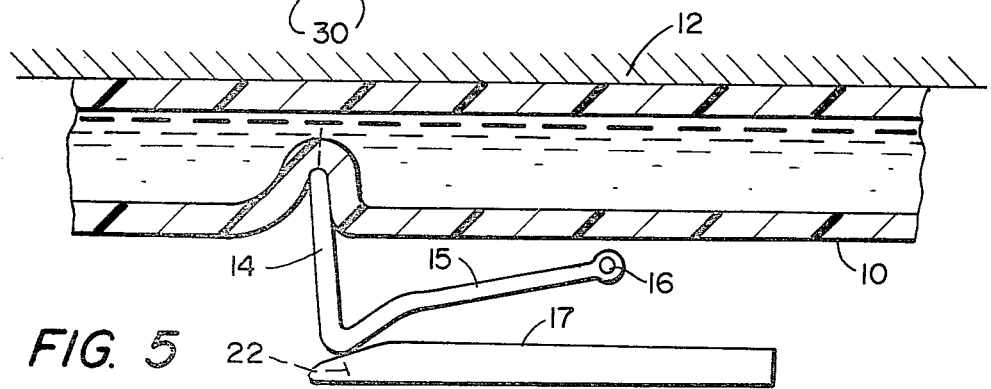
FIG. 5 is a partial cross sectional view as in FIG. 2 showing the valve in partial release.

Although the perpendicular application of force to close the flexible tubing is the principal object of the device shown in FIGS. 1-4, the device can also be used to reduce the rate of flow through the tubing. As shown in FIG. 5, compression member 14 can be positioned between the open position of FIG. 2 and the closed position of FIG. 3, along arcuate path 22, to partially close tubing 10. In the preferred embodiment, this is accomplished by positioning incline member 17 in an intermediate position between that shown in FIGS. 2 and 3. In such a position, the incline member serves to hold the compression member 14 against tubing 10 to partially close the tubing.

Figure 6:
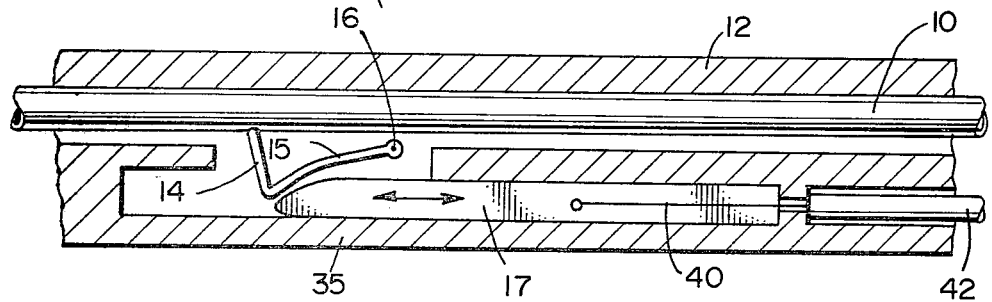
FIG. 6 is a plan view in partial cross section showing the valve of FIG. 1 together with an illustrative control mechanism.

FIG. 6 illustrates a preferred embodiment of the invention which can be used together with a remote control apparatus. In the illustrated device, tubing 10 is located in a slot 34 between base member 12 and compression member 14. The compression member 14 is the same as that shown in FIGS. 1-5, and includes attaching arm 15 and support pivot 16. Force means for exerting a force against the compression member perpendicular to the flow axis of the tubing includes a support member 35, fixed with respect to base member 12, and a movable incline member 17. The incline member 17 can be moved to a position between the support member 35 and the compression member 14 to close the tubing, as shown in FIGS. 3 and 4. Incline member 17 contacts and wedges against the lower end of the compression member 14 to rotate arm 15 and force the compression member toward the closed position. As in FIG. 4, the incline can also be used to position the compression member in any intermediate position between the open and closed positions.

The incline member 17 and its associated support 35 function as a control means for the valve and can be connected to a mechanical linkage to permit remote control. For example, a standard coaxial control cable 40 can be used as the mechanical linkage, with the outer casing 42 anchored to support member 35 and the cable 40 attached to incline member 17. The other end of the control cable (not shown) can be attached to any suitable control apparatus, such as a throttle control. By means of the control cable, fluid flow through the tubing can be adjusted from a remote location.

The present invention is particularly useful in application where a valve is required on a flexible fluid line which carries a periodically reversing flow of fluid. By applying a closing force perpendicular to the flow axis of the tubing, the closing force tends to resist equally the reopening force of the fluid pressure in the tubing from either direction. Thus, the closing force required to close a tubing with a single closing device is minimized. Furthermore, the invention provides a suitable apparatus for controlling the flow of fluid through a continuous length of flexible tubing. It is possible to install the valve without cutting the tubing or interrupting the flow of fluid. Fluid connections are not required for the valve. In addition, the preferred apparatus allows for remote control of the valve.

A valve is provided for controlling the flow of fluid through a continuous piece of flexible tubing. The valve is both reliable and allows for remote control. The valve will control with equal facility the flow from either direction through the tubing.

What is claimed is:

1. In a valve for rapidly and effectively controlling a reversing flow of fluid in flexible conduit means, an elongate base member, a transverse pivot support spaced from said elongate member, a length of flexible tubing positioned between said base member and said transverse pivot support, pivotally movable compression means mounted on said pivot support, said compression means including a pivot arm portion and a protruding compression member in the form of a transverse substantially flat member extending outward from said arm portion so as to extend transversely across said flexible tubing, said substantially flat compression member movable along an arcuate pathway between an outer valve-open position and an inner valve-closed position, the plane of said substantially flat compression member being perpendicular to the axis of said flexible tubing member in said valve-closed position, an incline member movable generally parallel to said base member and flexible tubing and slidably engageable with said compresion means to move said pivot arm portion and said compression member between valve-open and valve-closed positions, and means to periodically control the slidable movements of said incline member to effect periodic pivotal movements of said compression means between a valve-closed position in which said compression member squeezes and deforms the intervening flexible tubing to a fluid restricting closed position and a valve-open position in which said compression member is spaced from said base member sufficiently to release the tubing to a normal extended valve-open position.

* * * * *